Jan. 10, 1967   MASAMI AIZAWA   3,297,303
FISHING-NET HAULING APPARATUS
Filed Jan. 5, 1965

INVENTOR.
MASAMI AIZAWA
BY

United States Patent Office 3,297,303
Patented Jan. 10, 1967

3,297,303
FISHING-NET HAULING APPARATUS
Masami Aizawa, 57 Aza Odomari Oaza Tashirohama,
Ishinomaki, Japan
Filed Jan. 5, 1965, Ser. No. 423,427
Claims priority, application Japan, Nov. 5, 1964,
39/86,264
6 Claims. (Cl. 254—138)

This invention relates to an improved fishing-net hauling apparatus whereby a draught of each hauling operation may be increased, a manual tugging operation is reduced and consequently the intervals needed in each hauling may be considerably abridged.

It is an object of the present invention to provide a fishing-net hauling apparatus whereby a fishing-net can be hauled accurately without becoming partially entangled or biased in one direction, while a draught for each hauling operation may be increased and intervals needed in hauling a fishing-net may be abridged.

It is another object of the present invention to provide an improved fishing-net hauling apparatus whereby an accidental slippage of fishing-net seldom takes place during the hauling operation.

With these objects in view and other objects hereinafter set forth, the arrangement of each working member will be described hereinbelow and in the claims affixed herewith.

In the accompanying drawings which show an embodiment of the present invention;

Figure 1:
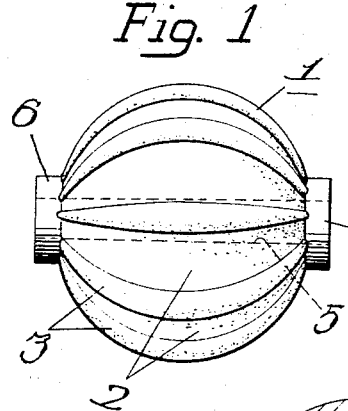
FIG. 1 is a front view of the roller member of the present invention.

Referring to FIG. 1 in particular, a spherical roller member 1 made of rubber or the like material is provided with a plurality of alternately arranged elevators or strips 3 and depressions or slots 2 extending longitudinally on the surface thereof. The roller member 1 includes a square-shaped axis hole 5 in which is fitted a rotary spindle 4 for rotating the roller member. The spindle 4 is located centrally of said roller member 1 and parallel to the longitudinal direction of said slots or strips 2, 3. A cylindrical end extension or guide member 6 is provided at each end of said roller member 1.

Figure 4:
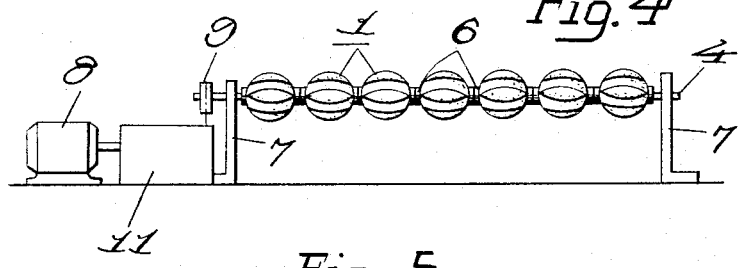
FIG. 4 is a front elevation view of the hauling apparatus of the invention in its operative state.

As shown in FIG. 4, a plurality of roller members 1 each having the abovementioned structure are fitted end to end on a rotary spindle 4 journaled at both ends within bearing holes provided in supporting rods 7, 7. The supporting rods 7, 7 are erected upright on the deck of a fishing boat 10 or on any suitable rigid surface and clamped in a suitable manner (not shown) and made so as to be turned at an angle of 90° or 180°, so that they may be laid by on the deck or within the hatch of a fishery boat after hauling. A motive power transmitting apparatus 9 is coordinated to either end of said rotary spindle 4 and is driven by a motor 8 through suitable decelerating means 11.

Figure 2:
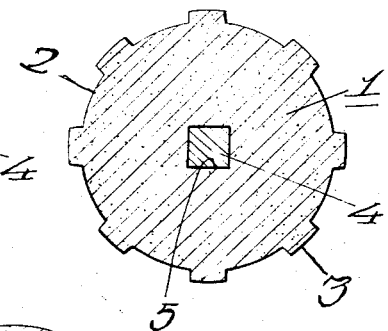
FIG. 2 is a cross section of the roller member.
Figure 3:
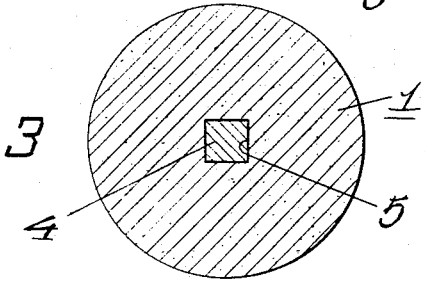
FIG. 3 is a view similar to FIG. 2 of another embodiment of the roller member.
Figure 5:
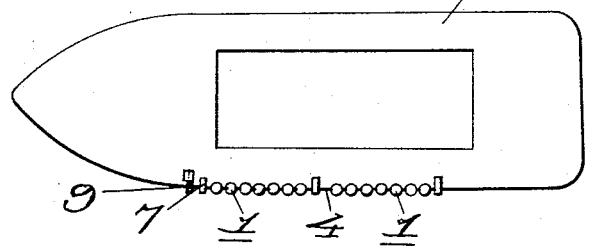
FIG. 5 is top plan view of a fishing vessel illustrating the hauling apparatus as mounted.

As shown in FIG. 5, the hauling apparatus according to this invention can be used attached to the deck of the fishing boat 10 or mounted to the top of a rock on shore, if desired. Instead of a roller member 1 as described in the embodiment shown in FIGS. 1 and 2, the roller member may be of the simple spherical structure as shown in FIG. 3. It is also to be noted that the shapes of engaging slots provided to the outer surface of a roller member may be variable in accordance with the mesh size, mesh shape and property of fishing nets. As will be seen in the above description, a plurality of roller members are mounted on the rotary spindle 4 and rotated therewith. Since the roller members of the present invention are spherical and provided with alternate elevated and depressed strips on the outer surfaces thereof, a concatenation of basin-like surfaces facing with the bottom sides to each other and provided respectively with radially extending alternately elevated and depressed strips or slots is formed between the adjoining rollers. These X-shaped spaced apart surfaces provided respectively with indentations play the principal role in increasing the hauling capacity of the present apparatus, and make it possible to haul a fishing net as in the case of a line-hauler or a net-hauler smoothly, accurately and without forming any partial twist or entanglement. Since the roller members in the present hauling apparatus are composed of rubber or the like material, a slippage of nets or ropes seldom takes place and a hauling operation may be carried out by a considerably fewer number of workers.

During the hauling operation, it is often the case that a fishing net is biased to one direction while hauled. The present hauling apparatus is not affected, due to the spherical shape of roller members, with the shifted positions of the fishing-nets, and a hauling may be carried out smoothly and uniformly. It is also among other advantages of the present invention that it is easily constructed, and suited to production en masse. While the preferable embodiment of the present invention has so far been described with reference to the attached drawings, it is to be noted that the present invention is not limited thereto, but various other modifications as will be described in the claims appended hereto may naturally come within the scope of this invention.

What is claimed is:

1. A fishing net hauling apparatus comprising a rotatable mounting spindle and a plurality of substantially spherical ball members mounted on said spindle in side-by-side relationship therealong and affixed to said spindle for rotation therewith about the axis of said spindle, said ball members defining upwardly and downwardly curved surfaces along said spindle for facilitating the even feeding of a fishing net thereover when said spindle is rotated with said ball members.

2. A fishing net hauling apparatus according to claim 1, wherein said ball members include a surface formed with a plurality of longitudinally extending raised surfaces defined around the periphery thereof.

3. A fishing net hauling apparatus according to claim 1, wherein said ball members have a substantially smooth outer surface and are made with a resilient material having relatively high frictional characteristics.

4. A fishing net hauling apparatus according to claim 1, wherein each of said ball members includes a cylindrical extension extending axially outwardly from at least one end around said spindle.

5. A fishing net hauling apparatus according to claim 1, wherein said ball members are provided with squared bores, said spindle being squared and fitting in said bores to affix said bore member to said spindle for rotation therewith.

6. A fishing net hauling apparatus according to claim 1, including bracket members for rotatably supporting each end of said spindle, said bracket members being constructed to be mounted on a deck of a fishing vessel, and motor means connected to said spindle to rotate said spindle.

References Cited by the Examiner

UNITED STATES PATENTS

| 2,578,622 | 12/1951 | York | 226—193 X |
| 2,795,320 | 6/1957 | Dillingham | 226—188 X |
| 3,058,640 | 10/1962 | Schuster | 226—194 X |

FOREIGN PATENTS

| 276,804 | 9/1927 | Great Britain. |
| 548,072 | 9/1942 | Great Britain. |
| 45,475 | 8/1928 | Norway. |

ROBERT B. REEVES, *Primary Examiner.*